United States Patent Office 2,970,063
Patented Jan. 31, 1961

2,970,063

PROCESS FOR MAKING DISPERSIBLE
VEGETABLE GUMS

Wesley A. Jordan and William E. Skagerberg, Minneapolis, Minn., assignors to General Mills, Inc., a corporation of Delaware No Drawing. Filed Mar. 12, 1958, Ser. No. 720,830

8 Claims. (Cl. 106—208)

The present invention relates to a process of making dispersible vegetable gums. These gums generally are used industrially in the form of an aqueous solution or dispersion, frequently at approximately 1% concentration. These gums are hydrophilic carbohydrate materials which tend to swell upon addition to water and later are converted to viscous gel-like sols. In order to obtain maximum swelling rate, it is generally desirable to have the gum in a finely divided solid condition so that it will have maximum area to contact with water and thus the process of swelling rapidly is expedited.

However, when these vegetable gums are reduced to the very finely divided condition and an attempt is made to disperse them in water, a new problem is encountered. The finely divided gum particles tend to take up water so rapidly that lumps or gel-like masses form. These lumps or gel-like substances are a mass of gum, wet on the outside but dry or gel-like in the center. These lumps or gel masses usually resist dispersion even upon the application of vigorous agitation or cooking. Consequently, it is frequently necessary to strain the sol to effect removal of these lumps. This quantity of gum removed is generally wasted.

While, therefore, it is generally desirable to have the gum in a finely divided condition in order to effect rapid swelling, there is a practical limit on the fineness of the gum in view of this tendency to lump or ball up. When the particle size of the gum is in excess of about $50\mu$ there usually is little difficulty in effecting dispersion. Particles smaller than $50\mu$, however, are very difficult to disperse without forming lumps.

Attempts have been made in the past to overcome these difficulties by making a product in the form of an agglomerate of very finely divided particles. Thus, in the Christianson and Ramstad patent, U.S. 2,662,882, there is described a process of agglomerating fine gum particles into a large agglomerate particle where the individual particles are held together by a dried soluble film of the gum itself. This accomplished by mixing finely divided gum particles with a restricted quantity of water so that there is a limited amount of hydration of the individual particles to the extent that they will cohere after drying into a more or less loosely bound agglomerate. These agglomerates, upon being immersed in water, should readily disintegrate and disperse into the individual particles which then hydrate and dissolve without lumping or balling up.

In attempting to carry out this potential process commercially, certain difficulties are encountered. It is extremely difficult to distribute uniformly the restricted amount of moisture throughout the mass of fine gum particles. Some localized areas of the mass get more water than is necessary to moisten the particle surface for the formation of the loose agglomerate. The increased moisture content causes some of the gum particles to become so thoroughly hydrated that individual particles adhere together so tenaciously that they resemble a single larger particle. In other words, they do not disintegrate and swell readily on being immersed in water. These larger granules may be considered as having been fused together and it is necessary to separate them and regrind them before they can be used for easy dispersion in water. This regrinding then produces a substantial amount of fines, which must be again agglomerated or they will cause lumping or balling up.

It has now been discovered that it is possible to produce agglomerates of fine gum particles by a controlled hydration process. This process permits the uniform distribution of an aqueous medium throughout the mass of gum particles so that they are uniformly hydrated to a controlled degree. They agglomerate uniformly so that the agglomerates will uniformly disintegrate readily upon being immersed in water.

It is, therefore, an object of the present invention to provide a novel process of agglomerating finely divided gum particles by the controlled hydration of individual particles to effect a controlled degree of agglomeration, such that the agglomerates will readily and uniformly disintegrate upon being immersed in water.

The invention involves the treatment of finely divided gum particles with an aqueous medium which effects a controlled rate of hydration of the gum, as will be pointed out more fully hereinafter. Generally, the aqueous solution used for agglomeration should retard the swelling rate of the gum by 50% or more as compared with the swelling rate of the gum in water. The rate at which the aqueous medium swells the gum is determined by measuring the rate at which the viscosity of a dispersion of the gum in the aqueous medium increases and comparing this rate with the rate at which the viscosity of a dispersion of the gum in pure water increases. The details of how this is determined are as follows:

495 g. of the aqueous medium in which the gum is to be dispersed is placed in the mixing vessel of a Waring Blendor. The aqueous medium is then agitated at a moderate rate (controlled by a variable voltage control) and 5 g. of the gum in a finely divided form is gradually added to the agitated aqueous medium. The agitation should be sufficient to maintain the particles in a suspended condition and a suitable degree of agitation one such that the vortex produced by the agitation extends down to approximately half way between the base of the vessel and the upper surface of the liquid in the vessel while it is being agitated. The exact degree of agitation is not critical but there should be provided sufficient agitation to maintain the individual gum particles in a separate dispersed condition.

This agitation in the Waring Blendor is continued for 2 minutes after which the suspension is transferred to a beaker and allowed to stand for an additional 13 minutes. During this period gentle agitation may be provided to maintain the gum particles in suspension, in the event that there is any tendency for the gum particles to settle. The temperature of the aqueous medium is maintained at approximately 25° C. through this period. The viscosity of the aqueous dispersion is determined after this 15 minute period in a Brookfield Synchro-Lectric Viscometer (Model RVF) using a No. 1 spindle at 4 r.p.m. and this viscosity is compared with the viscosity of the aqueous medium itself (without any gum) to determine the part of the viscosity which may be attributed to the hydration of the gum. This viscosity attributed to the hydration of the gum is then compared with the viscosity which is attributed to the hydration of the gum in pure water. Data on the comparison of these hydration rates is given in the table which appears hereinafter. In connection with this table, it should be pointed out that the viscosity data are the actual readings on the Brookfield viscometer and some of these may not represent true viscosities particularly at the lower ratings because of the inability of this particular instrument to accurately measure low viscosity with this particular spindle, at the stated rate of rotation. These readings are, however, an adequate measure for the purpose of the present invention and the results indicated are reproducible.

As an example, finely divided guar gum, when dispersed as described in the above test, will produce a 1% sol having a viscosity of approximately 800 centipoises in 15 minutes. This means that the water has hydrated the guar to increase the viscosity practically 800 centipoises, as compared with the viscosity of the dispersing medium itself, in this instance, water. For the purposes of the present invention, an aqueous medium which will hydrate the gum under the conditions of this test at a rate no greater than one half of the rate at which water hydrates that particular gum would be suitable for the present invention. For example, one of the preferred dispersing media is a 5% solution of animal glue. This 5% solution by itself has a viscosity of approximately 12 centipoises. When a guar gum sol of 1% concentration is made from this 5% glue solution and dispersed as described above, the solution has a viscosity of approximately 31 cps. Thus, the glue solution has affected an increase in viscosity of approximately 19 cps. Since a straight 1% guar sol in water has a viscosity of approximately 800 centipoises greater than water, this increase in viscosity of only 19 centipoises in the case of the 5% glue solution is far less than 50% of the increase in viscosity which would be contributed by a pure water dispersing medium.

There is a wide variety of aqueous media that may be used for the purposes of the present invention. These include aqueous solutions of both organic and inorganic materials. Typical of the organic aqueous solutions are mixtures of water with lower aliphatic water miscible alcohols such as methyl, ethyl, and isopropyl; polyhydric alcohols such as ethylene glycol, propylene glycol, glycerol; ketones such as acetone, methyl ethyl ketone, methyl isobutyl ketone, and so forth. Other organic materials which may be used to form solutions include various water soluble sugars such as sucrose; and colloidal materials such as animal glues, starches, and the like. Inorganic aqueous solutions which may be used include solutions of the sodium and potassium chlorides and sulfates, calcium chloride, calcium hydroxide, and the like. Any aqueous solution of an organic or inorganic material or mixtures of the same which have the above-described effect on the rate of hydration of the gum may be used for the present purposes. Some of the above materials such as the glues and starches may be in the form of gels at room temperature. They may be used in the form of gels or in the form of more fluid solutions.

The invention is applicable to a variety of vegetable gum materials. Typical gums to which the process may be applied include the mannan type gums such as guar, locust bean, honey locust, flame tree, paloverde, tara, cassia occidentalis; as well as the pathological exudate type of gum such as tragacanth, karaya, sassa, arabic, and so forth. The process also works on other polymeric carbohydrates and derivatives which have similar properties of contributing viscosity to aqueous sols, such as carboxymethyl cellulose. The term "gum" as used herein is intended to include these materials. These gums may all vary in the extent to which they are subject to the above-described difficulties. Of these gums, guar gum hydrates very rapidly, and, accordingly, the tendency for lumping or balling up is increased. Accordingly, the invention is particularly applicable to guar gum.

In carrying out the process, the gum and the aqueous medium, in the proportions suitable for the purpose, are mixed in any conventional type of mixing equipment. The mixing equipment should be of such a type which will effectively distribute the aqueous medium uniformly throughout the gum mass so that each particle is incorporated into an agglomerate. One type of equipment for accomplishing this result is a muller which is conventionally used for the production of putty. A preferred method involves spraying the aqueous medium into an air suspension of the gum as in a tumbling device. The medium coats the particles and causes them to adhere in the form of loosely held agglomerates. When the mixture has been agitated sufficiently to effect the uniform distribution of the aqueous medium, the mixture is in the form of relatively large masses of soft, spongy material formed by the association of large numbers of individual agglomerates. These masses are then dried in any conventional way and when dried are readily friable into the individual agglomerates. The agglomerates themselves are composed of a substantial number of the original, individual fine gum particles. While the original gum particles may have a size of less than $50\mu$, the agglomerates themselves have particle sizes substantially in excess of $50\mu$, preferably in the range of 100–400 microns. These agglomerates, when dispersed in water, disperse and swell without lumping or balling up. With reasonable degrees of agitation, they disintegrate readily to the individual gum particles, which then hydrates to form a clear sol. The following examples will serve to illustrate the invention.

In all the following examples, the gums which were employed were sufficiently fine in particle size that in its untreated state it presented considerable difficulty from lumping and balling up when an attempt was made to disperse it directly in water. The examples illustrate that the treatment is effective to take this non-dispersible gum and put it into a form in which it is readily dispersible without these difficulties.

*Example I*

10 parts of guar gum were mulled with 5 parts of an aqueous solution containing 10% methyl alcohol until the gum partially swelled forming a light fluffy product. The product was dried at 140° C. for 3 minutes. The dried product dispersed instantly upon addition to water, swelling into a viscous sol.

*Example II*

10 parts of guar gum were mulled with 7.5 parts of an aqueous solution containing 10% ethyl alcohol until a light, fluffy product resulted. This product was dried at 125° C. for 4 minutes, driving off the water and alcohol added. The dried product dispersed instantly and rapidly formed a sol.

*Example III*

10 parts of guar gum were mixed with 6.1 parts of a 15% solution of isopropyl alcohol. The mixture was mulled until a fluffy product developed. After granulating this mixture it was dried at 109° C. for 4 minutes. The resulting product dispersed rapidly and formed a viscous sol.

*Example IV*

10 parts of guar gum were mixed with 6 parts of a 25% ethylene glycol solution. The mixture was mulled until a light fluffy product developed. After granulating this mixture it was dried at 109° C. for 4 minutes. The resulting product dispersed rapidly and formed a viscous sol.

*Example V*

10 parts of guar gum were mulled with 7.65 parts of 30% aqueous propylene glycol solution until the gum swelled sufficiently to form a light, fluffy product. This product was dried at 150° C. for 3.5 minutes. Upon adding the agglomerated granules to water, they disintegrated and the individual granules rapidly swelled to form a smooth sol.

*Example VI*

10 parts of guar gum were mulled with 7.5 parts of

25% aqueous glycerol solution. The gum partially swelled, forming a light, fluffy material. This product was dried at 109° C. for 5 minutes. Upon adding the finished product to water it dispersed instantly, forming a sol.

*Example VII*

10 parts of a finely divided guar gum were mulled with 7.5 parts of a 50% aqueous sucrose solution. The partially swollen gum was granulated by passing it through a screen having openings approximately 1/16 inch square. After granulation the product dried for 5 minutes at 150° C. The finished product was in the form of aggregates which dispersed instantly. The aggregates disintegrated instantly in water and the individual particles began to swell to develop viscosity of the solution.

*Example VIII*

10 parts of guar gum were mulled with 6.5 parts of an aqueous 10% acetone solution. The gum partially swelled, forming a light, fluffy material. This product was dried at 109° C. for 5 minutes. The resulting product dispersed and swelled immediately when added to water.

*Example IX*

10 parts of guar gum were mulled with 5 parts of a 10% aqueous methyl ethyl ketone solution. The mulled product was light and fluffy. This product was dried 3 minutes at 82° C. The agglomerated product dispersed instantly when added to water, forming a viscous sol.

*Example X*

10 parts of guar gum were mulled with 5 parts of an acetic acid solution having 3.1 pH. The mulled product was light and fluffy. The mulled product was dried 5 minutes at 78° C. The dried product dispersed instantly, forming a sol.

*Example XI*

10 parts of guar gum were mixed with 7 parts of citric acid solution having a pH of 3.1. The mixture was mulled until a light fluffy product developed. After granulating this mixture it was dried at 80° C. for 3 minutes. The resulting product dispersed rapidly and formed a viscous sol.

*Example XII*

10 parts of guar gum were mixed with 5 parts of an aqueous phosphoric acid solution having a pH of 3.1. The mixture was mulled until a light fluffy product developed. After granulating this mixture it was dried at 80° C. for 3 minutes. The resulting product dispersed rapidly and formed a viscous sol.

*Example XIII*

10 parts of guar gum were mixed with 5 parts dilute hydrochloric acid having a pH of 2.65. The mixture was mulled until a light fluffy product developed. After granulating this mixture it was dried at 115° C. for 3 minutes. The resulting product dispersed rapidly and formed a viscous sol.

*Example XIV*

10 parts of guar gum were mulled with 5 parts of aqueous $Na_2CO_3$ solution, pH 9.9. The mulled gum was light and fluffy. This product was dried at 90° C. for 5 minutes. It dispersed instantly but swelled slowly, forming a sol.

*Example XV*

10 parts of guar gum were mulled with 5 parts of aqueous $NH_4OH$ solution, pH 9.7. The mulled gum was light and fluffy. The mulled gum was dried at 90° C. for 5 minutes. The dried gum dispersed instantly, forming a sol.

*Example XVI*

10 parts of guar gum were mixed with 5 parts of a calcium hydroxide solution having a pH of 9.9. The mixture was mulled until a light fluffy product developed. After granulating this mixture it was dried at 90° C. for 5 minutes. The resulting product dispersed rapidly and formed a viscous sol.

*Example XVII*

10 parts of guar gum were mulled with 5 parts of a 15% NaCl solution. The mulled product was light and fluffy. This product was dried at 90° C. for 5 minutes. The finished product dispersed instantly when added to water, forming a viscous sol.

*Example XVIII*

10 parts of guar gum were mulled with 5 parts of a saturated Glauber salt solution ($Na_2SO_4 \cdot 10H_2O$). The mulled product was light and fluffy. This product was dried at 110° C. for 5 minutes. The dried product dispersed immediately, forming a viscous sol.

*Example XIX*

10 parts of guar gum were mulled with 5 parts of a 5% solution of bone glue in water. Following mulling, the product was granulated, dried for 4 minutes at 80° C. and then passed through a U.S. Standard 50 mesh screen. The agglomerates thus produced dispersed in water in 10 seconds and disintegrated to yield the individual particles, which then dissolved to increase the viscosity of the solution.

*Example XX*

10 parts of guar gum were thoroughly mulled with 5 parts of a 10% bone glue solution. During the mulling process, the gum slowly swelled, forming a light, fluffy product. This product was dried at 80° C. for 5 minutes. The dried product dispersed instantly and rapidly formed a sol.

*Example XXI*

10 parts of locust bean gum were mulled with 9.05 parts of 50% ethanol solution. The mulled product was light and fluffy. The mulled product was dried 5 minutes at 70° C. The treated gum dispersed instantly upon adidtion to water and developed a thicker sol than the untreated original gum.

*Example XXII*

10 parts of non-dispersible karaya gum was mulled with 5 parts of 50% aqueous ethyl alcohol solution. The mulled product became granular. It was dried 5 minutes at 100° C. The dried product dispersed immediately upon addition to water and rapidly formed a sol.

*Example XXIII*

10 parts of non-dispersible sodium carboxymethyl cellulose was mulled with 5 cc. of 30% aqueous acetone solution. The mulled product became granular. It was dried at 140° C. for 5 minutes. This product dispersed immediately upon adding to water.

*Example XXIV*

10 parts of non-dispersible tragacanth gum was mulled with 7.05 parts of aqueous 50% ethyl alcohol solution. The gum became granular during swelling. It was dried at 70° C. for 5 minutes. This product dispersed immediately when added to water.

*Example XXV*

10 parts of non-dispersible Irish moss extract was mulled with 5 parts of 50% ethanol solution. The mulled product was dried at 63° C. for 8 minutes. The dried product dispersed immediately, forming a smooth sol. As calculated from the preceding examples the quantity of aqueous liquid employed varied such that between about 20 and about 40 percent of moisture was added to the dry gum material.

In the following table there is a comparison of the various aqueous media used in the examples and the effect of these media on the hydration rate of the gum. In the table, the first column indicates the example number; the second column, the gum used; the third column, the aqueous medium employed; the fourth column, the viscosity of the aqueous medium itself; the fifth column is the viscosity of the 1% gum sol produced by using the aqueous medium; and the sixth column is the viscosity differential, showing the increase in viscosity due to the gum; the seventh column shows the percentage comparison of this increase as compared with the increase in viscosity obtained when water is used as the medium for dispersing the particular gum. For Examples 1–20, this percentage figure is obtained by dividing the column 6 figure by 830. For Examples 21–25 the percentage figure is obtained by a similar comparison with the particular control.

It will be evident from the preceding examples that a wide variety of materials may be used for effecting the agglomeration of finely divided gum particles. The effects obtained may vary from one aqueous medium to another and from one gum material to another. The invention is particularly applicable to guar gum in view of its high rate of hydration, which increases the tendency toward lumping or balling up and complicates the dispersion process. As to the aqueous media used for treating the gum particles, applicants prefer glue for the production of a gum agglomerate for general utility. The agglomerates produced with glue as the aqueous medium give an aqueous sol which is smoother and of better clarity. It modifies the gel characteristic of the sol, making the sol more nearly similar to the sols produced from more expensive gums such as the alginates. Other aqueous media may be used to effect a simultaneous modification of the gum while effecting the agglomeration. Thus, with mild acids having a pH in the range of 2–4, or mild alkali, having a pH in the range of 9–13, it is possible to produce an agglomerate in the usual way, and when these agglomerates are dried at moderately elevated temperatures such as 80–150° C., the acid or alkali, as the case may be, may effect some modification such as dextrinizing of the gum to modify its properties and to lower its viscosity in the sol form. These modified gums are particularly desirable for certain applications.

TABLE

| 1 | 2 | 3 | 4 | 5 | 6 | 7 |
|---|---|---|---|---|---|---|
| Ex. No. | Gum Used | Aqueous Medium | Viscosity [1] of Aqueous Medium | 15 Min. Viscosity [1] of 1% Dispersability | Viscosity Differential | Viscosity Differential as Percent of $H_2O$ Hydration Rate $\left(\frac{\text{Col. 6}}{830}\right)$ |
| | | | Cp. | Cp. | Cp. | Percent |
| Control | Guar | Water | 5.0 | 835 | 830 | |
| 1 | do | 10% Methanol | 5.0 | 52.5 | 47.5 | 5.7 |
| 2 | do | 10% Ethanol | 7.5 | 17.5 | 10.0 | 1.2 |
| 3 | do | 15% Isopropanol | 7.5 | 10.0 | 2.5 | 0.3 |
| 4 | do | 25% Ethylene Glycol | 7.5 | 37.5 | 30.0 | 3.6 |
| 5 | do | 30% Propylene Glycol | 7.5 | 12.5 | 5.0 | 0.6 |
| 6 | do | 25% Glycerol | 10.0 | 315 | 305 | 36.8 |
| 7 | do | 50% Sucrose | 17.5 | 97.5 | 80.0 | 9.6 |
| 8 | do | 10% Acetone | 7.5 | 25.0 | 17.5 | 2.1 |
| 9 | do | 10% Methyl Ethyl Ketone | 7.5 | 50.0 | 42.5 | 5.1 |
| 10 | do | Acetic Acid, pH=3.1 | 5.0 | 220 | 215 | 25.9 |
| 11 | do | Citric Acid, pH=3.1 | 5.0 | 262 | 257 | 31.0 |
| 12 | do | Phosphoric Acid, pH=3.1 | 5.0 | 212.5 | 207.5 | 25.0 |
| 13 | do | Hydrochloric Acid, pH=2.65 | 5.0 | 280 | 275 | 33.2 |
| 14 | do | Sodium Carbonate, pH=9.9 | 5.0 | 100 | 95 | 11.4 |
| 15 | do | Ammonia, pH=9.7 | 5.0 | 10.0 | 5.0 | 0.6 |
| 16 | do | Calcium Hydroxide, pH=9.9 | 5.0 | 350 | 345 | 41.6 |
| 17 | do | 15% Sodium Chloride | 5.0 | 10.0 | 5.0 | 0.6 |
| 18 | do | Saturated Sodium Sulfate (10 $H_2O$) | 10.0 | 40.0 | 30.0 | 3.6 |
| 19 | do | 5% Bone Glue | 10.0 | 35.0 | 25.0 | 3.0 |
| 20 | do | 10% Bone Glue | 12.5 | 31.0 | 18.5 | 2.2 |
| Control | Locust Bean Gum | Water | 5.0 | 22.5 | 17.5 | |
| 21 | do | 50% Ethanol | 7.5 | 12.5 | 5.0 | $28.5\left(\frac{5.0}{17.5}\right)$ |
| Control | Karaya Gum | Water | 5.0 | [2] 2,015 | 2,010 | |
| 22 | do | 50% Ethanol | 7.5 | [2] 550 | 542.5 | $27.0\left(\frac{542.5}{2,010}\right)$ |
| Control | Na Carboxy Methyl Cellulose | Water | 5.0 | 45.0 | 40.0 | |
| 23 | do | 60% Acetone | 5.0 | 12.5 | 7.5 | $18.7\left(\frac{7.5}{40.0}\right)$ |
| Control | Tragacanth | Water | 5.0 | 30.0 | 25.0 | |
| 24 | do | 50% Ethanol | 7.5 | 10.0 | 2.5 | $10.0\left(\frac{2.5}{25.0}\right)$ |
| Control | Irish Moss | Water | 5.0 | 17.5 | 15.5 | |
| 25 | do | 50% Ethanol | 7.5 | 10.0 | 2.5 | $16.1\left(\frac{2.5}{15.5}\right)$ |

[1] Brookfield viscosity on a Model RVF Synchro-Lectric Viscometer (Serial #7617)—with a #1 spindle at 4 r.p.m.
[2] Brookfield viscosity on a Model RVF Synchro-Lectric Viscometer (Serial #7617)—with a #3 spindle at 20 r.p.m.

We claim as our invention:

1. The process of improving the dispersability of finely divided gum particles which comprises mixing said gum particles with a quantity of an aqueous solution which will increase the moisture content of the gum particles by between about 20 and about 40 percent, said aqueous solution being capable of hydrating the gum particles at a rate not in excess of 50 percent of the rate at which water hydrates said gum particles, to effect a controlled hydration of the individual gum particles and to effect agglomeration of the individual gum particles into agglomerates, and then drying the agglomerates to form dry agglomerates which readily disintegrate in water to yield individual gum particles.

2. Process according to claim 1 in which the aqueous solution is a solution of a water miscible alcohol.

3. Process according to claim 1 in which the aqueous solution is a glue solution.

4. Process according to claim 1 in which the aqueous solution is a solution of a water miscible ketone.

5. Process according to claim 1 in which the aqueous solution is a solution of a weak acid having a pH in the range of 2–4.

6. Process according to claim 1 in which the aqueous solution is a solution of a weak alkali having a pH in the range of 9–13.

7. Process according to claim 1 in which the individual particles are less than $50\mu$ in size and the agglomerates are over $100\mu$ in size.

8. Process according to claim 1 in which the gum is guar.

References Cited in the file of this patent

UNITED STATES PATENTS

| | | |
|---|---|---|
| 1,761,111 | Doty | Jan. 3, 1930 |
| 2,000,807 | Wig | May 7, 1935 |
| 2,376,656 | Buchanan | May 22, 1945 |
| 2,644,763 | Frisch et al. | July 7, 1953 |
| 2,662,882 | Christianson et al. | Dec. 15, 1953 |